(12) United States Patent
Valio et al.

(10) Patent No.: US 7,839,915 B2
(45) Date of Patent: Nov. 23, 2010

(54) RECEPTION OF A SPREAD SPECTRUM MODULATED SIGNAL

(75) Inventors: Harri Valio, Kammenniemi (FI); Samuli Pietila, Tampere (FI)

(73) Assignee: Nokia Corporation, Espoo (FI)

( * ) Notice: Subject to any disclaimer, the term of this patent is extended or adjusted under 35 U.S.C. 154(b) by 781 days.

(21) Appl. No.: 11/587,109

(22) PCT Filed: Apr. 21, 2005

(86) PCT No.: PCT/FI2005/050128

§ 371 (c)(1),
(2), (4) Date: Jul. 23, 2007

(87) PCT Pub. No.: WO2005/104392

PCT Pub. Date: Nov. 3, 2005

(65) Prior Publication Data

US 2007/0286265 A1 Dec. 13, 2007

(30) Foreign Application Priority Data

Apr. 23, 2004 (FI) ................................. 2004-5147

(51) Int. Cl.
*H04B 1/00* (2006.01)
(52) U.S. Cl. ................... 375/140; 375/149; 375/150; 375/152; 375/343; 375/355; 375/260; 375/267
(58) Field of Classification Search .......... 375/147, 375/152, 142, 149, 343, 355
See application file for complete search history.

(56) References Cited

U.S. PATENT DOCUMENTS

| 5,566,202 | A | 10/1996 | Lang |
| 5,852,630 | A * | 12/1998 | Langberg et al. ............ 375/219 |
| 5,901,171 | A | 5/1999 | Kohli et al. |
| 6,650,693 | B1 | 11/2003 | Park et al. |
| 7,173,957 | B2 * | 2/2007 | Shakeri et al. .............. 375/140 |
| 7,190,712 | B2 * | 3/2007 | Abraham et al. ............ 375/150 |
| 2003/0081660 | A1 | 5/2003 | King et al. |
| 2003/0219066 | A1 | 11/2003 | Abraham et al. |

* cited by examiner

*Primary Examiner*—Shuwang Liu
*Assistant Examiner*—Dhaval Patel
(74) *Attorney, Agent, or Firm*—Alfred A. Fressola; Ware, Fressola, Van Der Sluys & Adolphson LLP

(57) ABSTRACT

The present invention relates to a receiver for receiving a spread spectrum modulated signal, comprising a sampler for forming samples of a received signal, at least one reference code block for generating at least first and second reference codes, and a correlation block. The correlation block forms first and second reference code parts from at least one reference code, and correlates the first reference code part with the sample string to form first correlation part results, and correlates the second reference code part with the sample string to form second correlation part results, wherein the correlations are arranged to be performed at different times and by using the same sample string. The invention also relates to an electronic device comprising a receiver, a module to be used with a receiver, a system comprising a transmitter and a receiver for receiving the transmitted signal, a method and a computer software product.

30 Claims, 6 Drawing Sheets

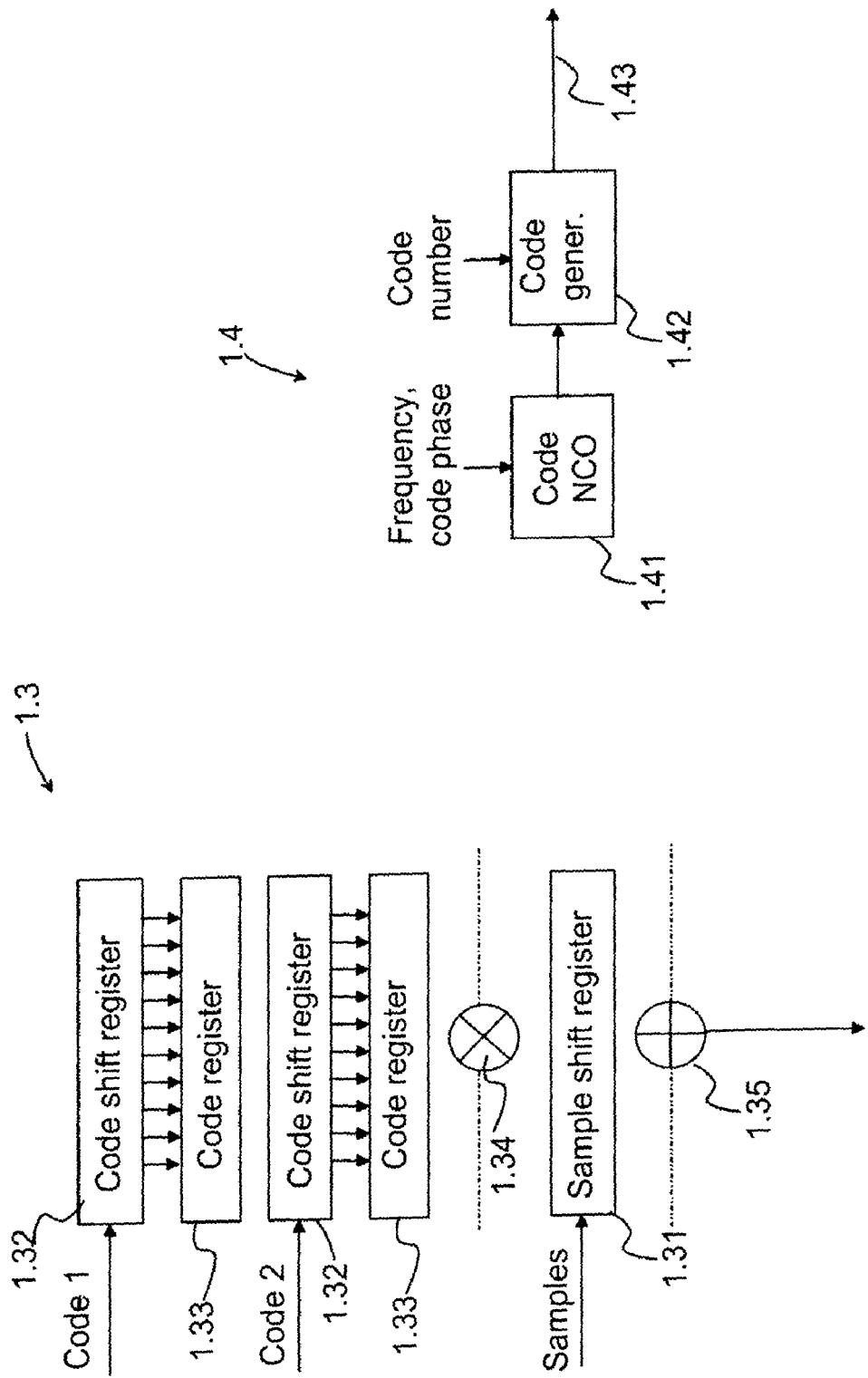

RECEPTION OF A SPREAD SPECTRUM MODULATED SIGNAL

CROSS REFERENCE TO RELATED APPLICATIONS

This application is for entry into the U.S. national phase under §371 for International Application No. PCT/FI05/050128 having an international filing date of Apr. 21, 2005, and from which priority is claimed under all applicable sections of Title 35 of the United States Code including, but not limited to, Sections 120, 363 and 365(c), which in turn claims priority under §119 to Finnish Patent Application No. 2045147 filed on Apr. 23, 2004.

FIELD OF THE INVENTION

The present invention relates to a receiver for receiving a spread spectrum modulated signal, comprising at least a sampler for forming samples of a received signal, at least one channel-specific reference code block for generating at least one reference code, and a correlation block. The invention also relates to an electronic device which comprises a receiver for receiving a spread spectrum modulated signal, comprising at least a sampler for forming samples of a received signal, at least one reference code block for generating at least one reference code, and a correlation block. The invention also relates to a system with a transmitting station for transmitting a spread spectrum modulated signal and a receiver for receiving a spread spectrum modulated signal, the receiver comprising at least a sampler for forming samples of a received signal, at least one reference code block for generating at least one reference code, and a correlation block. Furthermore, the invention relates to a module which is arranged to be used for receiving a spread spectrum modulated signal in a receiver, the module comprising at least a sampler for forming samples of a received signal, at least one reference code block for generating at least one reference code, and a correlation block. The invention also relates to a method for receiving a spread spectrum modulated signal, comprising forming samples of a received signal, generating at least one reference code, and performing correlation between said at least one reference code and the received signal. Moreover, the invention relates to a computer software product comprising machine executable commands for forming samples of a received spread spectrum modulated signal, for generating at least one reference code, and for performing correlation between said at least one reference code and the received signal.

BACKGROUND OF THE INVENTION

Spread spectrum modulated signals (CDMA, Code Division Multiple Access) are used, for example, in global navigation satellite systems (GNSS), such as the GPS system, as well as in many third generation mobile communication systems, such as the UMTS. For generating a spread spectrum modulated signal, the modulation is performed in a transmitter by using an individual spreading code, wherein several transmitters can simultaneously transmit a signal at the same frequency, when each transmitter is allocated a unique spreading code. For example, in satellite positioning systems, each satellite uses a spreading code of its own. In the receiver, the corresponding reference code is generated or it is read from the memory of the receiver, and this reference code is used for searching the received signal for the signal of the transmitter which is to be received. For successful signal reception, the receiver must perform acquisition of the signal, typically by using several correlators and controlling the code phase and frequency of the reference code, wherein the signals generated by the correlators are used to determine the correct code phase and the frequency shift. After the acquisition has been completed, the tracking of the signal is continued so that the reception of the signal and the demodulation of the information transmitted therein would be possible. In this tracking step, the code phase and frequency of the reference code are to be kept locked with the code phase and frequency of the signal to be received.

The acquisition and the tracking of the signal are problematic particularly indoors where the strength of the signal to be received is poor, possibly even lower than background noise. Such a situation occurs particularly in satellite positioning systems, in which the signal to be received is very weak upon arrival on the earth, and indoors this signal can be further attenuated by the walls of buildings. To cure this problem, solutions of prior art are aimed at implementing the receiver by providing it with a large number of correlators and by using a long integration time. At present, receivers may comprise as many as about 16,000 correlators. For the sake of comparison, it should be mentioned that the first portable GPS receivers only comprised 12 or even fewer correlators. The increase in the number of correlators naturally also means that the circuit board area required for implementing the correlators is significantly increased as well. Furthermore, this increases the power consumption of the receiver. Because of the higher power consumption, the heating of the device may also be increased.

SUMMARY OF THE INVENTION

According to the present invention, a method has been invented for receiving a spread spectrum modulated signal, wherein it is possible to utilize the correlators more efficiently. The invention is based on the idea of computing the correlation over several samples at one time, and also in such a way that several correlations are computed in groups simultaneously. According to a first aspect of the present invention there is provided a receiver for receiving a spread spectrum modulated signal, comprising at least:

a sampler for forming samples of a received signal,
at least one reference code block for generating at least one reference code, and
a correlation block comprising:
  a first register element for forming first and second reference code parts from at least one reference code,
  a second register element for forming a sample string from samples formed of the received signal, and
  a correlator for correlating the first reference code part with the sample string to form first correlation part results, and for correlating the second reference code part with the sample string to form second correlation part results, wherein said correlator is configured to perform said correlations at different times and by using the same sample string, wherein said first and second reference code parts are adapted to be periodically updated.

According to a second aspect of the present invention there is provided an electronic device comprising a receiver for receiving a spread spectrum modulated signal, which comprises at least:
  a sampler for forming samples of a received signal,
  at least one reference code block for generating at least one reference code, and a correlation block comprising:
- a first register element for forming first and second reference code parts from at least one reference code,
- a second register element for forming a sample string from samples formed of the received signal, and
- correlator for correlating the first reference code part with the sample string to form first correlation part results, and for correlating the second reference code part with the sample string to form second correlation part results, wherein said correlator is configured to perform said correlations at different times and by using the same sample string, wherein said first and second reference code parts are adapted to be periodically updated.

According to a third aspect of the present invention there is provided a system comprising a transmitting station for transmitting a spread spectrum modulated signal, a receiver for receiving a spread spectrum modulated signal, which comprises at least:
- a sampler for forming samples of a received signal,
- at least one reference code block for generating at least one reference code, and
- a correlation block comprising:
  - a first register element for forming first and second reference code parts from at least one reference code,
  - a second register element for forming a sample string from samples formed of the received signal, and
  - a correlator for correlating the first reference code part with the sample string to form first correlation part results, and for correlating the second reference code part with the sample string to form second correlation part results, wherein said correlator is configured to perform said correlations at different times and by using the same sample string, wherein said first and second reference code parts are adapted to be periodically updated.

According to a fifth aspect of the present invention there is provided a module comprising at least:
- an input for receiving samples formed of a received signal,
- at least one reference code block for generating at least one reference code, and
- a correlation block comprising:
  - a first register element for forming first and second reference code parts from at least one reference code,
  - a second register element for forming a sample string from samples formed of the received signal, and
  - a correlator for correlating the first reference code part with the sample string to form first correlation part results, and for correlating the second reference code part with the sample string to form second correlation part results, wherein said correlator is configured to perform said correlations at different times and by using the same sample string, wherein said first and second reference code parts are adapted to be periodically updated.

According to a sixth aspect of the present invention there is provided a method for receiving a spread spectrum modulated signal, which method comprises:
- receiving samples of a received signal,
- generating at least one reference code, and
- performing a correlation between said at least one reference code and the received signal,
- forming first and second reference code parts from at least one reference code,
- forming a sample string of the samples formed of the received signal, and
- correlating the first reference code part with the sample string to form first correlation part results, and correlating the second reference code part with the sample string to form second correlation part results, said correlations being performed at different times and by using the same sample string, and
- periodically updating said first and second reference code parts,
- forming first and second reference code parts from at least one reference code,
- forming a sample string of the samples formed of the received signal, and
- correlating the first reference code part with the sample string to form first correlation part results, and correlating the second reference code part with the sample string to form second correlation part results, said correlations being performed at different times and by using the same sample string.

According to a seventh aspect of the present invention there is provided a computer software product which comprises machine executable commands:
- for forming samples of a received spread spectrum modulated signal,
- for generating at least one reference code,
- for performing a correlation between said at least one reference code and the received signal,
- for forming first and second reference code parts from at least one reference code,
- for forming a sample string from samples formed of the received signal,
- for correlating the first reference code part with the sample string to form first correlation part results, and for correlating the second reference code part with the sample string to form second correlation part results, said correlations being performed at different times and by using the same sample string, and
- periodically updating said first and second reference code parts,
- for forming first and second reference code parts from at least one reference code,
- for forming a sample string from samples formed of the received signal, and
- for correlating the first reference code part with the sample string to form first correlation part results, and for correlating the second reference code part with the sample string to form second correlation part results, said correlations being performed at different times and by using the same sample string.

According to an eighth aspect of the present invention there is provided a module comprising at least:
- a first input for receiving samples formed of a received signal,
- a second input for receiving at least one reference code, and
- a correlation block comprising:
  - a first register element for forming first and second reference code parts from at least one reference code,
  - a second register element for forming a sample string from samples formed of the received signal, and
  - a correlator for correlating the first reference code part with the sample string to form first correlation part results, and for correlating the second reference code part with the sample string to form second correlation part results, wherein said correlator is configured to perform said correlations at different times and by using the same sample string, wherein said first and second reference code parts are adapted to be periodically updated.

According to a ninth aspect of the present invention there is provided a receiver for receiving a spread spectrum modulated signal, comprising at least:
- a sampler for forming samples of a received signal,
- at least one reference code block for generating at least one reference code, and
- a correlation block comprising:
  - means for forming first and second reference code parts from at least one reference code,
  - means for forming a sample string from samples formed of the received signal, and
  - correlation means for correlating the first reference code part with the sample string to form first correlation part results, and for correlating the second reference code part with the sample string to form second correlation part results, wherein said correlations are arranged to be performed at different times and by using the same sample string, ps wherein said first and second reference code parts are adapted to be periodically updated.

For example, the following advantages are achieved by the present invention: The circuit board area of the receiver is saved when compared with arrangements of prior art, because the same multiplication operations, code shifts and additions can be used in several different codes and code phases. Furthermore, the bandwidth of the signal after the correlator is relatively wide, typically covering the whole Doppler frequency range to be searched, when the receiver is applied in connection with satellite positioning systems. Thus, a division of the frequency range to be searched in smaller subbands and a search in the subbands will not be necessary. Furthermore, the number of ports and the circuit board area can be reduced by using time multiplexing, wherein some blocks of the receiver can be used for the acquisition of different signals. Such time multiplexing is possible in the receiver according to the invention, for example, for the reason that the processing rate required after the group correlator is relatively low. The correlator according to the invention can also be divided into various parts. Furthermore, the invention makes it possible to use the same blocks for both the acquisition and the tracking.

DESCRIPTION OF THE DRAWINGS

In the following, the invention will be described in more detail with reference to the appended drawings, in which FIG. 3 shows the correlation block of the receiver according to FIG. 1 in a reduced block chart, FIG. 4 shows the channel-specific reference code block of the receiver according to FIG. 1 in a reduced block chart.

DETAILED DESCRIPTION OF THE INVENTION

Figure 1:
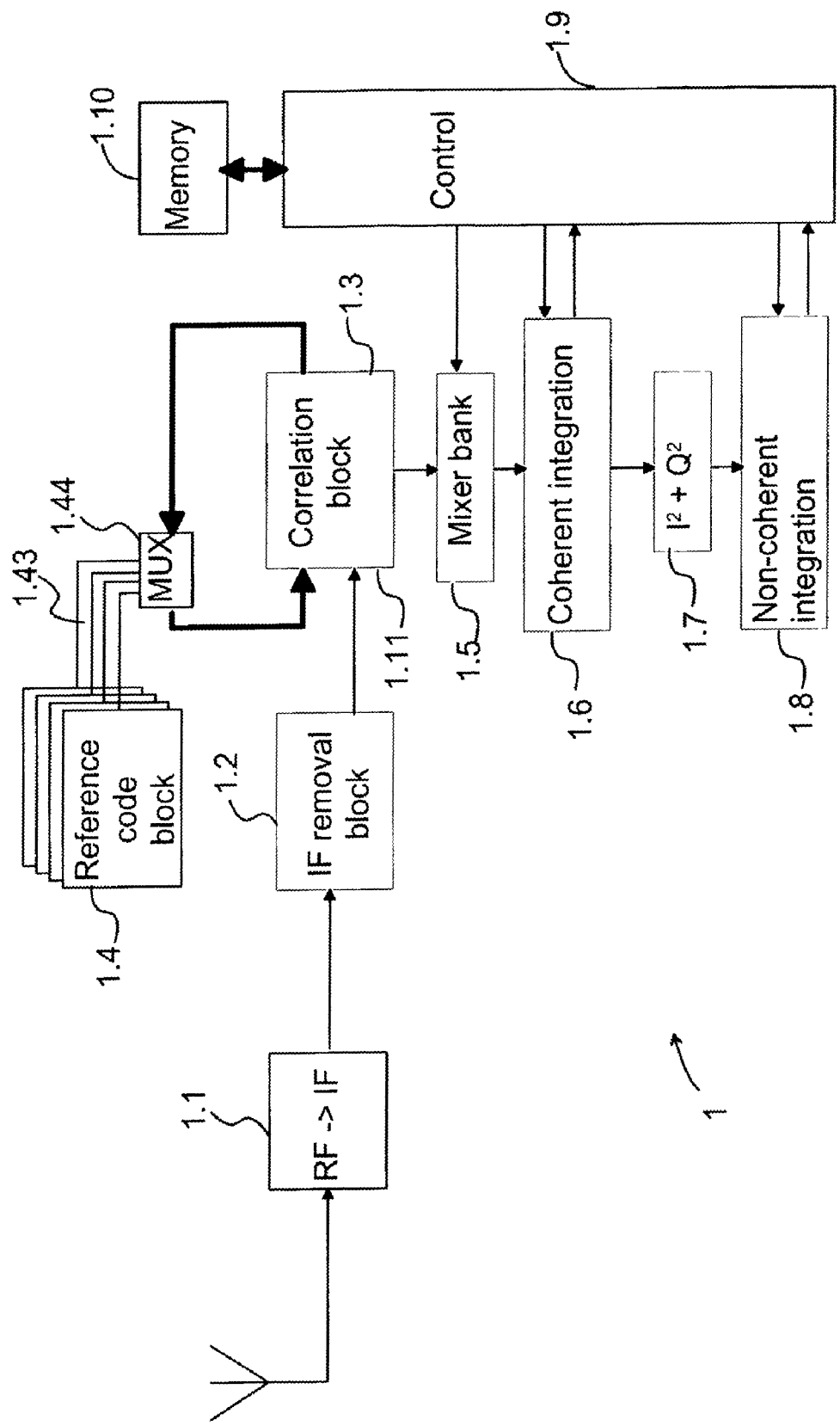
FIG. 1 shows a receiver according to one embodiment of the invention in a reduced block chart.
Figure 8:
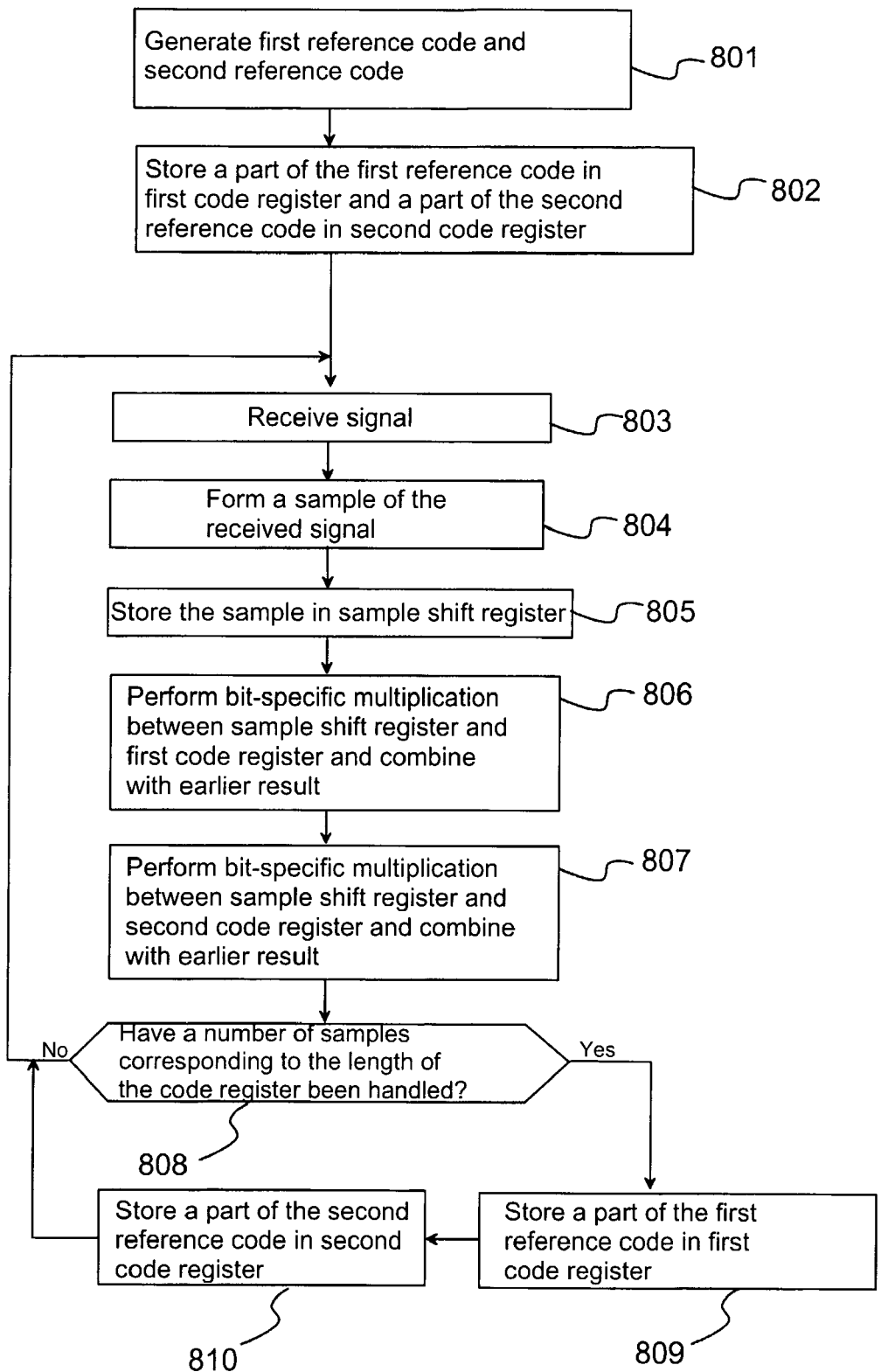
FIG. 8 shows the method according to one embodiment of the invention in a simplified flow chart.

In the following, the invention will be described by using, as an example of the receiver, the receiver 1 of a satellite positioning system shown in FIG. 1, for receiving (block 803 in FIG. 8) spread spectrum modulated signals from satellite stations. However, it will be apparent that the invention can also be applied in other systems using spread spectrum modulated signals. The receiver 1 comprises a receiving stage 1.1 for taking the necessary steps for the processing of signals in a given frequency band, such as bandpass filtering, amplification, conversion to an intermediate frequency, and sampling (block 804). After this, the samples are input in an intermediate frequency removal block 1.2 and further in a correlation block 1.3. The receiver comprises channel-specific reference code blocks 1.4. The number of the channel-specific reference code blocks 1.4 is selected, for example, to be equal to the number of signals to be received from different satellites simultaneously. For example, to perform acquisition and tracking operations for the signals of four satellites simultaneously, four channel-specific reference code blocks 1.4 are used, in which each the reference code corresponding to one satellite code is generated or read from a memory 1.10 (block 801). After the correlation block 1.3, the output signals of the correlators are input in a mixer block 1.5. The output signal of the mixer block is subjected to coherent integration in block 1.6. If necessary, it is also possible to perform incoherent integration in block 1.8., wherein prior to the incoherent integration, a real signal is formed of the complex signal (I, Q) in block 1.7.

Figure 2:
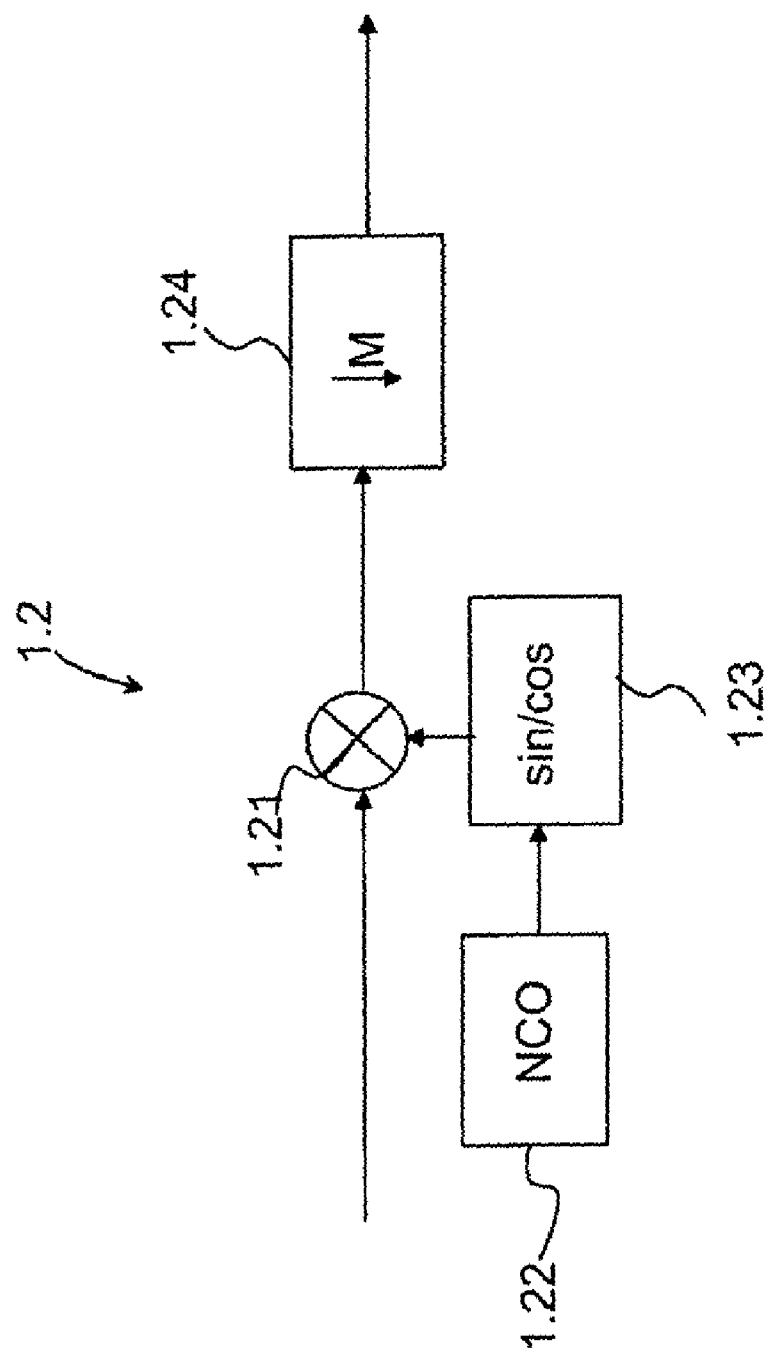
FIG. 2 shows the intermediate frequency removal block of the receiver according to FIG. 1 in a reduced block chart.

FIG. 2 shows one intermediate frequency removal block 1.2 which can be used in the receiver 1 according to the invention. The samples input in the intermediate frequency removal block 1.2 are mixed in a mixer 1.21 with a signal generated by a numerically controlled oscillator 1.22, of which signal two signals of different phases are first formed in a phase shift block 1.23. The phase shift between these signals is about 90 degrees, and the aim in the mixer 1.21 is to clear the received signal of a possible intermediate frequency (IF) as well as of the satellite Doppler frequency, wherein the output of the mixer 1.21 is a baseband signal. This baseband signal is then sampled in a decimation block 1.24 whose sampling frequency is different from the sampling frequency used at the sampling in the receiving stage 1.1. The samples taken in the decimation block 1.24 are input in a correlation block 1.3.

FIG. 3 shows the structure of the correlation block 1.3 used in a receiver according to one embodiment of the invention. The correlation block 1.3 comprises a sample shift register 1.31 in which the samples are input from the intermediate frequency removal block 1.2. The sample shift register 1.31 is chipped, i.e., samples are shifted at the same rate as samples are input in the correlation block 1.3.

Furthermore, the correlation block 1.3 comprises N code shift registers 1.32 and code registers 1.33. Number N corresponds to the number of receiving blocks; for example, there are four code registers 1.33. For the sake of clarity, however, only two code shift registers 1.32 and code registers 1.33 are shown in FIG. 3. Each code shift register 1.32 is supplied with bits of the reference code corresponding to the code used in the modulation of one signal to be received, at the same rate as samples are input in the sample shift register 1.31 (block 805); that is, one bit of the reference code is input per each sample. Thus, the length of the code shift register 1.32 and the code register 1.33 is equal to the length of the sample shift register 1.31. After a given number of code bits has been stored in the code shift register 1.32, the code bits in the code shift register 1.32 are stored in the code register 1.33. The storage in the code register is performed after the storage of the number of samples corresponding to the length of the code shift register 1.32 (block 808). If the length of the code shift register 1.32 is denoted with GC (GC storage locations), the data of the code shift register 1.32 is copied in the code register 1.33 after every GC samples (blocks 802, 809, 810). The length of the code shift register 1.32 is not necessary equal to the length of the reference code, but coherent integration can be applied to the output of the correlation block 1.3 by extending the integration over the whole epoch.

The correlation block 1.3 can also be implemented without the code shift registers 1.32. Thus, all the data entering the code register is received from the channel-specific reference code block 1.4 either in parallel during a single epoch, or serially by using a higher clock frequency than that used by the correlation block 1.3.

After the data of the code shift register 1.32 have been copied/transferred at least once (block 802) into the code register 1.33 (i.e., the code shift register 1.32 is full of samples), the multiplier 1.34 performs a bit-specific multiplication in a multiplexed manner with the samples of the sample shift register 1.31 and the bits of each code register 1.33. In this context, multiplexing means that the samples of the sample shift register 1.31 and one code register 1.33 are multiplied at one time in the multiplier 1.34, and the multiplication results (correlation part results) are combined in a combination block 1.35. These multiplications and combinations are repeated until all or a sufficient number of code registers have been scanned through (blocks 806, 807). The result is N correlation results. Consequently, the multiplication between each code register 1.33 and the sample shift register 1.31 can be performed for the same sample string by using only one multiplier 1.34 and only one combination block 1.35. After this, the multiplication is always performed after a new sample has been input in the sample shift register 1.31. Consequently, this is a series of multiplications, in which the value of the code register 1.33 is the same for GC samples, but the sample shift register 1.31 is shifted by one after every multiplication and a new sample is input in the first register. In this way, the correlation can be made between the samples and the codes (code register×sample shift register). Thus, in the receiver according to the invention, the content of the code register 1.33 is not changed after every sample but after every GC samples.

The output of the correlation block 1.3 comprises Nsamples, each of which corresponds to the integration for GC samples by one correlator. The output signal of the correlation block 1.3 thus corresponds to the output signals of correlators (GC correlators) in a receiver of prior art. However, one difference is, for example, that each sample of the correlation block 1.3 according to the invention corresponds to the integration of GC samples. The relatively short correlation in the correlation block 1.3 means that the post-correlation bandwidth is relatively broad. One non-restricting numerical example to be mentioned is the following application in the GPS system. The length of the sample shift register 1.31 is 66 samples, and 2 samples are taken of each signal chip (sampling rate about 2 MHz). This results in a bandwidth of about 31 kHz.

When the receiver 1 according to the invention is applied, for example, in satellite positioning systems, only one intermediate frequency removal block 1.2 is needed before the correlator, because the bandwidth after the correlation block 1.3 covers the whole Doppler frequency range searched for satellite signals (frequency shift caused by Doppler shift). Moreover, a single sample shift register 1.31 will be sufficient, because the contents of all the code shift registers 1.33 can be multiplied with the content of this sample shift register 1.31.

Figure 5:
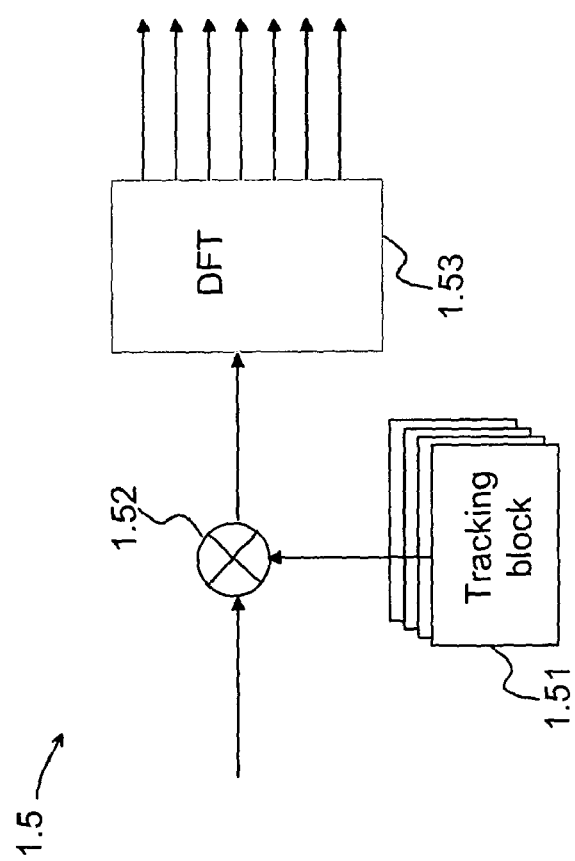
FIG. 5 shows the structure of a mixer block used in the receiver according to one embodiment of the invention in a reduced block chart.
Figure 7:
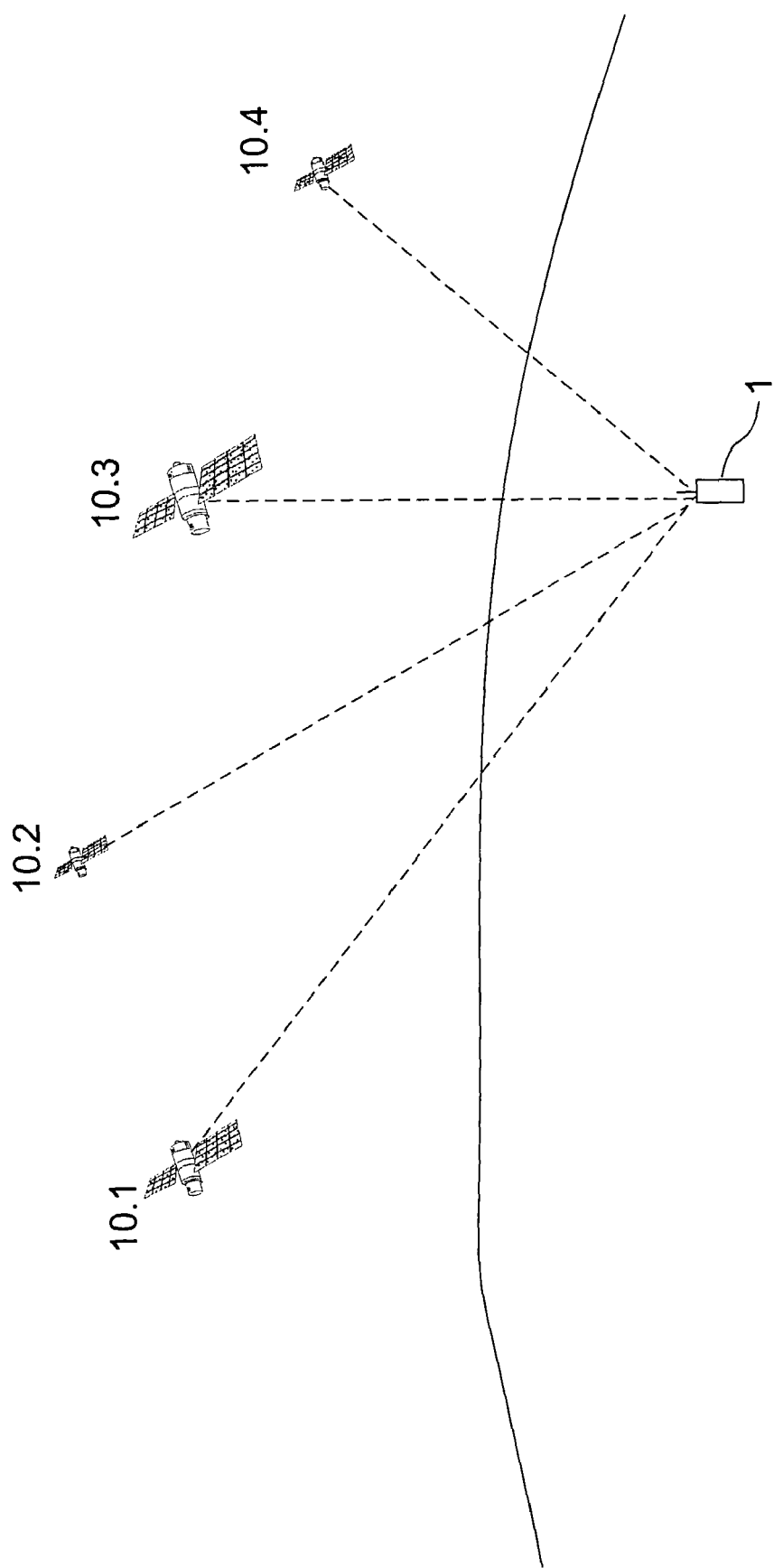
FIG. 7 shows a system in which the invention can be applied.

The signals formed in the correlation block 1.3 can then be input in the mixer block 1.5, of which one example is shown in FIG. 5. In this embodiment, the mixer block 1.5 comprises one Doppler tracking block 1.51 for each receiving channel, that is, for each signal to be received simultaneously. In a mixer 1.52, the signals formed in the correlation block 1.3 are mixed with the signal of the Doppler tracking block 1.51. The signals formed in the mixer 1.52 are subjected to a time-to-frequency conversion, for example a discrete Fourier transform, in a conversion block 1.53. Thus, information in the time domain can be converted to information in the time-frequency domain, to be used, for example, in the tracking function. The mixer 1.52 and the conversion block 1.53 can be shared by each Doppler tracking block 1.51. From the mixer block 1.5, the signals of the time-frequency domain are input in a coherent integration block 1.6. In the coherent integration block 1.6, the signal components I and Q are integrated, for example, on the length of the whole epoch, for example for acquisition and tracking.

The mixer block 1.5 and the coherent integration block 1.6 are controlled by a digital signal processor 1.9 or a corresponding controller. In the acquisition function, fixed values (frequency and phase) for a given search are set in the Doppler tracking blocks 1.51 of the mixer block 1.5. In the tracking function, the Doppler frequency blocks 1.51 of the mixer block are controlled to keep the receiver locked with the signal to be received. This is achieved by controlling the frequency and the phase, if necessary. In the tracking function, the digital signal processor 1.9 can read the results of the coherent integration from the memory area used by the coherent integration block 1.6, when the signal to be received is sufficiently strong. During the reception of a weak signal, the acquisition and tracking functions may further include incoherent integration in an incoherent integration block 1.8, wherein prior to this, the signal components are combined in a combination block 1.7, for example, by squaring both components and summing up the squared values. In this situation, the digital signal processor 1.9 reads the results of the incoherent integration from the memory area used by the incoherent integration block 1.8 and uses these values to control the acquisition/tracking.

Furthermore, FIG. 4 shows an example structure of the channel-specific reference code block 1.4 in a reduced block chart. It comprises a numerically controllable oscillator 1.41 for generating the clock signal for a code generator 1.42 to control the code bit rate. The code generator 1.42 is given control data to inform which reference code of the selectable reference codes is intended to be generated in the channel-specific reference code block 1.4 in question. The code formed in the channel-specific reference code block 1.4 is input in a code bus 1.43, from which the reference code generated by the desired channel-specific reference code block 1.4 is input via a selector 1.44 in the correlation block 1.3. On the other hand, instead of the channel-specific reference code block 1.4, the output of the code shift register 1.32 of the correlation block can be coupled by the selector 1.44 (FIG. 1) to the input of the code shift register 1.32 of the correlation block in the step when the whole reference code has been once input in the code shift register 1.32.

Figure 6:
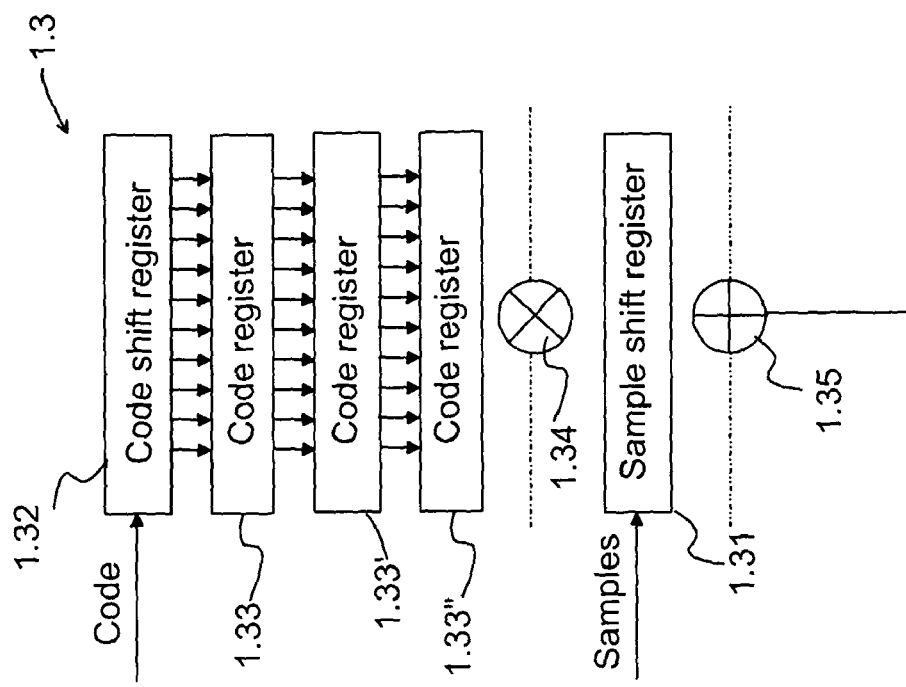
FIG. 6 shows the structure of another correlation block in a reduced block chart.

FIG. 6 shows the structure of yet another correlation block 1.3 in a reduced manner. It comprises several code registers 1.33, 1.33', 1.33", whose operation can be cascaded for example in the following way. When the code shift register 1.32 has become full after GC samples, the data of the second code register 1.33' is transferred to the third code register 1.33", the data of the first code register 1.33 is transferred to the second code register 1.33', and the data of the code transfer register 1.32 is transferred to the first code register 1.33. After this, the multiplication operations and the combination operations are carried out in the multiplier 1.34 and in the combination block 1.35, respectively, between each code register 1.33, 1.33', 1.33" and the sample shift register 1.31. The content of each code register 1.33, 1.33', 1.33" can be multiplied with the content of the sample shift register 1.31 by time multiplexing; that is, the multiplication and the combination are performed between one code register 1.33, 1.33', 1.33" and the sample shift register 1.31 at a time, and the result is recorded in the memory. The multiplications are repeated until all the code registers 1.33, 1.33', 1.33" have been scanned through, after which the correlation has been completed for one sample set of GC samples. After the next GC samples, the above-presented steps are taken again. The above-described procedure can be repeated for new samples. The steps can be taken for several channels in a multiplexed manner, wherein a code shift register 1.32 and a set of code registers 1.33, 1.33', 1.33" has been provided for each channel. By such an arrangement, it is possible to implement a longer matched filter than by using a single code register 1.33 of GC samples only. It is apparent that in this application, the number of code registers 1.33, 1.33', 1.33" is not necessarily three but also two code registers or more than three code registers can be used. The number of code registers can be selected, for example, so that all the multiplications can be performed during the reception of one sample (for example, if there are three code registers, the multiplication operation is repeated three times during the reception of one sample).

It is apparent that even though the control block 1.9 is presented as a separate block in the above description of the invention and in the appended drawings, some of the blocks of the receiver 1 can be implemented, for example, as functions of a digital signal processor used as the control block 1.9.

Furthermore, the invention can be implemented as a computer readable medium, stored with code, which when executed by a processor, cause a receiver according to the present invention to act in accordance with the present invention.

Furthermore, it will be apparent that the present invention is not limited solely to the above-presented embodiments but it can be modified within the scope of the appended claims.

The invention claimed is:

1. A receiver comprising:
    a sampler configured to form samples of a received spread spectrum modulated signal,
    at least one reference code block configured to generate at least one reference code, and
    a correlation block comprising:
        a first register configured to form first and second reference code parts from at least one reference code,
        a second register configured to form a sample string from samples formed of the received signal, and
        a correlator configured to correlate the first reference code part with the sample string to form first correlation part results, and to correlate the second reference code part with the sample string to form second correlation part results, wherein said correlator is configured to perform said correlations at different times and by using the same sample string, and
    a controller,
    wherein said first register comprises a code shift register and a code register for each reference code, and wherein said code shift register is configured to transfer data of the code shift register into the code register;
    said second register comprises a sample shift register,
    said controller is configured to transfer the data of said code shift register and sample shift register to store a new sample in the sample shift register and to read new reference code data into the code shift register after the formation of the new sample, and
    said code shift register, code register and sample shift register are equal in length;
    and wherein said first and second reference code parts are configured to be periodically updated.

2. The receiver according to claim 1 comprising a combination block configured to combine the first correlation part results to form a first correlation result, and to combine the second correlation part results to form a second correlation result.

3. The receiver according to claim 1 comprising at least a first channel-specific reference code block configured to generate a first reference code, and a second channel-specific reference code block configured to generate a second reference code, wherein said first register is configured to form the first reference code part of at least a part of the first reference code, and the second reference code part of a part of the second reference code.

4. The receiver according to claim 1, wherein said controller is configured to update the sample string and to perform said correlations after the formation of a new sample.

5. The receiver according to claim 1, wherein the sample shift register and the code shift register have a determined length, wherein said controller is configured to transfer the data of the code shift register into the code register after the formation of the number of samples corresponding to said length.

6. The receiver according to claim 1 wherein said correlation block comprises two or more code registers for each code shift register, and wherein the receiver comprises a multiplexer configured to perform the correlation in a multiplexed manner between the sample shift register and each code register.

7. The receiver according to claim 1 wherein said at least one channel-specific reference code block comprises a code generator configured to generate said at least one reference code.

8. The receiver according to claim 1 wherein said at least one reference code is stored in a memory.

9. The receiver according to claim 1 wherein said correlator comprises a multiplier configured to multiply the first reference code part with the sample string to form first correlation part results, and to multiply the second reference code part with the sample string to form second correlation part results.

10. The receiver according to claim 1 wherein said correlation block comprises a summer configured to sum the correlation part results to form a correlation result.

11. An electronic device comprising a receiver for receiving a spread spectrum modulated signal, which comprises at least:
    a sampler configured to form samples of a received signal,
    at least one reference code block configured to generate at least one reference code,
    a correlation block comprising:
        a first register configured to form first and second reference code parts from at least one reference code,
        a second register configured to form a sample string from samples formed of the received signal, and a correlator configured to correlate the first reference code part with the sample string to form first correlation part results, and to correlate the second reference code part with the sample string to form second correlation part results, wherein said correlator is configured to perform said correlations at different times and by using the same sample string, and a controller wherein said first register comprises a code shift register and a code register for each reference code and wherein said code shift register is configured to transfer data of the code shift register into the code register;

said second register comprises a sample shift register, and said controller is configured to transfer the data of said code shift register and sample shift register, to store a new sample in the sample shift register and to read new reference code data into the code shift register after the formation of the new sample, and said code shift register, code register and sample shift register are equal in length, and wherein said first and second reference code parts are adapted to be periodically updated.

12. The electronic device according to claim 11 comprising a combination block configured to combine the first correlation part results to form a first correlation result, and to combine the second correlation part results to form a second correlation result.

13. The electronic device according to claim 11, wherein said controller is configured to update the sample string and to perform said first and second correlations after the formation of a new sample.

14. The electronic device according to claim 11, wherein the sample shift register and the code shift register have a determined length, wherein said controller is configured to transfer the data of the code shift register into the code register after the formation of the number of samples corresponding to said length.

15. The electronic device according to claim 11, wherein said correlation block comprises two or more code registers for each code shift register, wherein the electronic device comprises a multiplexer configured to perform the correlation in a multiplexed manner between the sample shift register and each code register.

16. A system comprising a transmitting station for transmitting a spread spectrum modulated signal, a receiver for receiving a spread spectrum modulated signal, which comprises at least:

a sampler configured to form samples of a received signal, at least one reference code block configured to generate at least one reference code, a correlation block, comprising:

a first register configured to form first and second reference code parts from at least one reference code, a second register configured to form a sample string from samples formed of the received signal, and a correlator configured to correlate the first reference code part with the sample string to form first correlation part results, and configured to correlate the second reference code part with the sample string to form second correlation part results, wherein said correlator is configured to perform said correlations at different times and by using the same sample string, and a controller said first register comprises a code shift register and a code register for each reference code, and said code shift register is configured to transfer data of the code shift register into the code register;

said second register comprises a sample shift register, and said system is configured to transfer the data of said code shift register and sample shift register, to store a new sample in the sample shift register and to read new reference code data into the code shift register after the formation of the new sample, and said code shift register, code register and sample shift register are equal in length, and wherein said first and second reference code parts are adapted to be periodically updated.

17. The system according to claim 16, comprising a combination block configured to combine the first correlation part results to form a first correlation result, and to combine the second correlation part results to form a second correlation result.

18. A module comprising an input configured to receive samples formed of a received signal, at least one reference code block configured to at least one reference code, and a correlation block comprising:

a first register configured to form first and second reference code parts from at least one reference code, a second register configured to form a sample string from samples formed of the received signal, and a correlator configured to correlate the first reference code part with the sample string to form first correlation part results, and to correlate the second reference code part with the sample string to form second correlation part results, wherein said correlator is configured to perform said correlations at different times and by using the same sample string, wherein said first register comprises a code shift register and a code register for each reference code, and said code shift register is configured to transfer data of the code shift register into the code register, said second register comprises a sample shift register, and wherein the module is configured to transfer the data of said code shift register and sample shift register, to store a new sample in the sample shift register and to read new reference code data into the code shift register after the formation of the new sample, and that said code shift register, code register and sample shift register are equal in length, and said first and second reference code parts are adapted to be periodically updated.

19. The module according to claim 18 comprising a combination block configured to combine the first correlation part results to form a first correlation result, and to combine the second correlation part results to form a second correlation result.

20. The module according to claim 18, configured to update the sample string and to perform said first and second correlations after the formation of a new sample.

21. The module according to claim 18, wherein the sample shift register and the code shift register have a determined length, wherein the module is configured to transfer the data of the code shift register into the code register after the formation of the number of samples corresponding to said length.

22. The module according to claim 18, wherein said correlation block comprises two or more code registers for each code shift register, wherein the module comprises a multiplexer configured to perform the correlation in a multiplexed manner between the sample shift register and each code register.

23. A method comprising:
  receiving samples of a received spread spectrum modulated signal,
  inputting samples of a sample string in a sample shift register,
  generating at least one reference code,
  inputting the reference code in a code shift register, wherein the rate the reference code is input in the code shift register is dependent on the rate at which samples of the sample string are input in the sample shift register, and
  performing a correlation between said at least one reference code and the received signal,
  forming first and second reference code parts from at least one reference code,
  forming a sample string of the samples formed of the received signal,
  correlating the first reference code part with the sample string to form first correlation part results, and correlating the second reference code part with the sample string to form second correlation part results, said correlations being performed at different times and by using the same sample string, and
  wherein the sample shift register and the code shift register have a determined length, wherein the method comprises transferring the bits of the reference code input in the code shift register to the code register after the formation of the number of samples corresponding to said length, and periodically updating said first and second reference code parts.

24. The method according to claim 23 comprising combining the first correlation part results to form a first correlation result, and combining the second correlation part results to form a second correlation result.

25. The method according to claim 23 comprising updating the sample string, wherein said correlations are performed after the formation of a new sample.

26. A non-transitory computer readable medium stored with code, which when executed by a processor in a receiver, cause said receiver to perform
  forming samples of a received spread spectrum modulated signal,
  inputting samples of a sample string in a sample shift register,
  generating at least one reference code,
  inputting the reference code in a code shift register, wherein the rate the reference code is input in the code shift register is dependent on the rate at which samples of the sample string are input in the sample shift register,
  performing a correlation between said at least one reference code and the received signal,
  forming first and second reference code parts from at least one reference code,
  forming a sample string from samples formed of the received signal,
  correlating the first reference code part with the sample string to form first correlation part results, and correlating the second reference code part with the sample string to form second correlation part results, said correlations being performed at different times and by using the same sample string, and
  wherein the sample shift register and the code shift register have a determined length, wherein the computer readable medium is further stored with code, which when executed by said processor cause said receiver to perform transferring the bits of the reference code input in the code shift register to the code register after the formation of the number of samples corresponding to said length, and periodically updating said first and second reference code parts.

27. A non-transitory computer readable medium according to claim 26, further stored with code, which when executed by said processor cause said receiver to perform combining the first correlation part results to form a first correlation result, and combining the second correlation part results to form a second correlation result.

28. A module comprising:
  a first input configured to receive samples formed of a received signal,
  a second input configured to receive at least one reference code, and
  a correlation block comprising:
    a first register configured to form first and second reference code parts from at least one reference code,
    a second register configured to form a sample string from samples formed of the received signal, and
    a correlator configured to correlate the first reference code part with the sample string to form first correlation part results, and to correlate the second reference code part with the sample string to form second correlation part results, wherein said correlator is configured to perform said correlations at different times and by using the same sample string,
  said first register comprises a code shift register and a code register for each reference code, and said code shift register is configured to transfer data of the code shift register into the code register,
  said second register comprises a sample shift register,
  wherein the module is configured to transfer the data of said code shift register and sample shift register, to store a new sample in the sample shift register and to read new reference code data into the code shift register after the formation of the new sample, and that said code shift register, code register and sample shift register are equal in length, and said first and second reference code parts are configured to be periodically updated.

29. A receiver for receiving a spread spectrum modulated signal, comprising:
  sampling means for forming samples of a received signal,
  at least one reference code block for generating at least one reference code, and
  a correlation block comprising:
    means for forming first and second reference code parts from at least one reference code,
    means for forming a sample string from samples formed of the received signal, and
    correlation means for correlating the first reference code part with the sample string to form first correlation part results, and for correlating the second reference code part with the sample string to form second correlation part results, wherein said correlations are arranged to be performed at different times and by using the same sample string,
  said first register comprises a code shift register and a code register for each reference code, and said code shift register is configured to transfer the data of the code shift register into the code register,
  said second register comprises a sample shift register,
  wherein the receiver is configured to transfer the data of said code shift register and sample shift register, to store a new sample in the sample shift register and to read new reference code data into the code shift register after the formation of the new sample, and that said code shift register, code register and sample shift register are equal in length, and said first and second reference code parts are adapted to be periodically updated.

30. The receiver of claim 29, comprising means for combining the first correlation part results to form a first correlation result, and for combining the second correlation part results to form a second correlation result.

* * * * *